UNITED STATES PATENT OFFICE.

WALTER LAMB, OF ST. JOHN'S, NEWFOUNDLAND.

PROCESS OF FISH PRESERVATION.

No. 816,343.     Specification of Letters Patent.     Patented March 27, 1906.

Application filed October 19, 1904. Serial No. 229,176.

*To all whom it may concern:*

Be it known that I, WALTER LAMB, a citizen of the United States, residing at St. John's, in the Colony of Newfoundland, have invented certain new and useful Improvements in Processes of Fish Preservation, of which the following is a specification.

This invention is an improved process of preserving fresh fish by which I am able to produce a fish food of desirable flavor and to maintain the substance in a stable and wholesome condition for an indefinite length of time, so that it will be available for use in different climates.

In carrying my invention into practice I proceed as follows: The fish are first eviscerated and washed. They are then cooked sufficiently to allow the easy separation of the bones and skin. The fish are next divided into small pieces and placed upon a perforated receptacle and allowed to drain and evaporate until a large amount of the watery portion has drained away and the surface of the pieces of flesh have lost their watery condition and become slightly adhesive. The fish is now seasoned to taste, either with ordinary salt or with salted fish or a salted fish product, after which the fish is consolidated in the can, so as to expel all the air. When the solution is used, this is accomplished by putting the solution in the can and adding the fish to it, and as the fish sinks to the bottom consolidating it by pressure until the can is full. The excess of water portion which comes to the surface when the pressure is applied drains out or is taken away by means of an absorbent pad or material used for the purpose after the can is full of fish. This pad may consist of layers of any absorbent material and is simply placed on the top of the consolidated fish, so as to remove the watery portion which has come to the surface, after which the pad is removed. The can is now hermetically sealed. The can is then punctured near the soldered edge, placed under pressure until the ends are sufficiently concaved to expel the remaining air, after which the hole is sealed. The package is afterward sterilized in the usual way by boiling.

When the fish is ready for sealing, it is very much in the condition of a cheese, and the air that usually occupies the interstitial spaces between the pieces of fish has been entirely expelled.

The salted fish product used as a seasoning gives a more pronounced flavor, and the particles are incased in a mass of fresh fish and entirely excluded from the air, so that the substance will retain its flavor and be kept in a stable and wholesome condition for an indefinite length of time in any climate. When fish has been seasoned to taste and allowed to stand for some time, there is a flavor produced that recently-salted fish does not possess.

The salted fish product referred to is the serum and albumen of fish in a nearly saturated solution of salt and may be obtained in any suitable manner—as, for example, by cutting up raw fish in suitable pieces, and after salting the same and allowing it to stand for a few days the serum and albumen which exudes is drained off in any convenient manner and with it a certain amount of salt, or, if necessary, some pressure may be applied to the cut portions, which will tend to remove from the fish substantially all of the serum and albumen. This being collected in a suitable tank can be retained, as it is salted, and used as a fish product. In using this solution as a seasoning and flavoring I extract by pressure a large amount of the watery portion of the fresh fish and put the salted solution in its place, after which the mass is consolidated in the can, it being evident that the salted solution will penetrate the mass and drive out the air and that a large proportion will be retained therein after the consolidating operation.

The salted fish product used as a seasoning gives a very palatable flavor which is stable. The product is nutritious and will retain its prepared and wholesome condition for an indefinite length of time in any climate.

I am aware that prior to my invention canned fish have been subject to cooking, seasoning with salt, and perhaps comminution, and the method of hermetically sealing and sterilizing by boiling has long been practiced. Therefore I do not lay claim to any of these steps.

What I do claim as my invention, and desire to secure by Letters Patent, is—

1. A method of preserving fish which consists in eviscerating and cooking the fish, separating the bones and the skin, dividing the flesh into pieces, then seasoning the same, then expelling air by means of pressure on the fish after the fish has been placed in a can, removing a portion of the water and continuing these steps until the can is substantially filled, hermetically sealing the can, puncturing the same, expelling the air by means of pressure on the can and then sealing the can and then boiling it.

2. A method of preserving fish which consists in eviscerating and cooking the fish, separating the bones and skin, dividing the flesh into pieces, removing a portion of the water, mixing the drained flesh with a salted solution; removing the air by consolidation of the fish at the bottom of the said solution after the mixture has been placed in a can, removing the excess of liquid and continuing these steps until the can is substantially filled, hermetically sealing the can, then puncturing the same, then expelling the remainder of the air by pressure on the can and resealing the package and boiling the same.

St. John's, Newfoundland, October 13, 1904.

WALTER LAMB.

In presence of—
GEORGE O. CORNELIUS,
A. DOUGLAS PARSONS.